United States Patent
Becker et al.

(10) Patent No.: US 8,219,274 B2
(45) Date of Patent: Jul. 10, 2012

(54) 3-DIMENSIONAL PERCEPTION SYSTEM AND METHOD FOR MOBILE PLATFORM

(75) Inventors: Jan Becker, Palo Alto, CA (US); Soeren Kammel, San Jose, CA (US); Benjamin Pitzer, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 12/497,160

(22) Filed: Jul. 2, 2009

(65) Prior Publication Data

US 2011/0004366 A1 Jan. 6, 2011

(51) Int. Cl.
*G05D 1/00* (2006.01)
(52) U.S. Cl. .................................... 701/23; 706/45
(58) Field of Classification Search .............. 701/23, 701/28; 700/245; 318/568.12, 567; 706/45
See application file for complete search history.

(56) References Cited

U.S. PATENT DOCUMENTS

| | | | | |
|---|---|---|---|---|
| 4,954,962 A * | 9/1990 | Evans et al. | ...... | 701/28 |
| 5,502,638 A * | 3/1996 | Takenaka | ...... | 701/87 |
| 6,816,755 B2 | 11/2004 | Habibi et al. | | |
| 7,410,266 B2 * | 8/2008 | Seo et al. | ...... | 359/851 |
| 2010/0182311 A1 * | 7/2010 | Kim | ...... | 345/419 |

OTHER PUBLICATIONS

Skotheim et al., A Flexible 3d Vision System based on Structured Light for In-Line Product Inspection; Society of Photo-Optical Instrumentation Engineers; 2008; (12 pages); Norway.

Resko et al., 3D Image Sensor based on Parallax Motion; Acta Polytechnica Hungarica; 2007; vol. 4, No. 4; pp. 37-53 (17 pages); Budapest, Hungary.

Skotheim et al., Structured Light Projection for Accurate 3D Shape Determination; 12th International Conference on Experimental Mechanics; Aug. 29-Sep. 2, 2004; (8 pages); Trondheim, Norway.

Hager, A Modular System for Robust Positioning Using Feedback from Stereo Vision; IEEE Transactions on Robotics and Automation; 1997, vol. 13, No. 4.; p. 582-595, (14 pages); New Haven, CT, Aug. 1997.

Pages et al., A camera-projector system for robot positioning by visual servoing; undated, (8 pages).

Le Moigne et al., Structured Light Patterns for Robot Mobility. IEEE Journal of Robotics and Automation. 1988. p. 541-548 (8 pages), Oct. 1988.

* cited by examiner

*Primary Examiner* — Dalena Tran
(74) *Attorney, Agent, or Firm* — Maginot, Moore & Beck

(57) ABSTRACT

In one embodiment, an autonomously navigated mobile platform includes a support frame, a projector supported by the frame, a sensor supported by the frame, a memory including a plurality of program instructions stored therein for generating an encoded signal using a phase shifting algorithm, emitting the encoded signal with the projector, detecting the emitted signal with the sensor after the emitted signal is reflected by a detected body, associating the detected signal with the emitted signal, identifying an x-axis dimension, a y-axis dimension, and a z-axis dimension of the detected body, and one or more of a range and a bearing to the detected body, based upon the associated signal, identifying a present location of the mobile platform, navigating the mobile platform based upon the identified location, and a processor operably connected to the memory, to the sensor, and to the projector for executing the program instructions.

20 Claims, 2 Drawing Sheets

3-DIMENSIONAL PERCEPTION SYSTEM AND METHOD FOR MOBILE PLATFORM

FIELD OF THE INVENTION

The present invention relates generally to mobile devices and more particularly to mobile devices with autonomous capabilities.

BACKGROUND OF THE INVENTION

Mobile devices which are capable of autonomous operations such as navigation and mapping activities are being developed for a number of applications. Such applications include basic devices which perform simple tasks such as vacuuming to more complex devices which interact more substantially with humans.

As the complexity of the operations increase, the need for the device to understand the surrounding environment may also increase. Thus, while a vacuuming device may only need to avoid obstacles, a device travelling across an area of varied terrain may need to quantify the degree of difficulty presented by various obstacles so as to select the optimum route.

The ability to ascertain both the location of a mobile device as well as the nature of the surrounding environment is complicated by the fact that various navigation systems used with mobile devices require data acquisition over an extended period of time in order to obtain the requisite amount of data to provide a good understanding of the surrounding environment. In certain systems, such data acquisition requires the device to be immobile as the data is obtained and processed. Such systems introduce undesired delay in the movement of the device.

Other mapping and localization methods have been developed which do not always require the device to be immobile during data acquisition and processing. Such systems may utilize simultaneous localization and mapping (SLAM) and 3-D perception. While effective, this approach requires significant hardware investment and a significant amount of computational processing.

Three-dimensional (3-D) models of objects can provide information useful for a variety of applications including navigation control and mapping functions. The creation of a 3-D model of either an object, a structure, or a scene, however, can require the involvement of highly skilled professionals with extensive artistic knowledge, expensive modeling equipment and time intensive efforts.

Various approaches to simplifying the generation a 3-D model of an object or scene have evolved. One common approach incorporates a triangulation system. A triangulation system projects beams of light onto an object, typically using a LASER. The emitted light is then reflected off the object at an angle relative to the light source and an imaging component which is spaced apart from the light source collects the reflection information. Based upon an association of the emitted beam and the reflected beam, the system then determines the coordinates of the point or points of reflection by triangulation. A single dot system projects a single beam of light which, when reflected, produces a single dot of reflection. A scanning line system sends a plane of light against the object, the plane of light is reflected as a curvilinear-shaped set of points describing one contour line of the object. The location of each point in that curvilinear set of points can be determined by triangulation.

Another commonly used 3-D modeling approach is a stereoscopic system employing one or more imaging systems located at known locations or distances from each other to take multiple images of a 3-D object. The captured images are processed with a pattern recognition system that relates the various points of the object in the multiple images and triangulates to extract depth information of these points, thereby obtaining the shape/contour information of the 3-D object.

The systems described above are costly, bulky, and may require substantial knowledge to operate. Accordingly, while providing sufficient data to produce an accurate 3-D model, the usefulness of the systems is limited. Various coding schemes have been developed to allow a fewer number of images to be used in generating sufficient data for generating a 3-D model. One such coding scheme uses binary codes like the Gray code to produce only one-to-one correspondences between projector and camera coordinates. This approach is costly (in the sense of projection quality and measuring time) since high resolution patterns are needed to achieve desired spatial resolution.

Another coding scheme incorporates one dimensional discrete Fourier transforms (DFT). One-dimensional (1-D) DFT phase demodulation requires the projected 1-D fringes to be aligned with the camera. Accordingly, the depth range of the system is limited and susceptible to errors when incorporated into a non-fixed system. Two-dimensional DFT phase demodulation systems similarly suffer from high depth ranges. In principle, the direction of the spectral components needed to retrieve the desired phase information in a two-dimensional DFT phase demodulation system can be determined. The automated design of a suited frequency filter is, however, complicated and rather slow.

Another class of coding techniques is Moiré techniques which are based on the interference of two patterns. Moiré techniques require high carrier frequencies and are therefore sensitive to focal blur. This interference can be generated optically or within a computing system. Optical interference can be mitigated by incorporation of an alignment procedure using a reference grid or, if using the discrete structure of the camera sensor itself, by incorporating a costly system calibration. Computing system interference is mitigated using a signal analysis that is similar to DFT phase demodulation, and which suffers the same shortcomings as the DFT phase demodulation schemes.

What is needed is a system that can be used to generate 3-D data required to support navigation or mapping functions. A system which is inexpensive and that does not requires significant computational processing power would be beneficial.

SUMMARY OF THE INVENTION

In one embodiment, an autonomously navigated mobile platform including a support frame, a projector supported by the frame, a sensor supported by the frame, a memory including a plurality of program instructions stored therein for generating an encoded signal using a phase shifting algorithm, emitting the encoded signal with the projector, detecting the emitted signal with the sensor after the emitted signal is reflected by a detected body, associating the detected signal with the emitted signal, identifying an x-axis dimension, a y-axis dimension, and a z-axis dimension of the detected body, and one or more of a range and a bearing to the detected body, based upon the associated signal, identifying a present location of the mobile platform, navigating the mobile platform based upon the identified location, and a processor operably connected to the memory, to the sensor, and to the projector for executing the program instructions.

In a further embodiment, a method of operating an autonomously navigated mobile platform includes generating an encoded signal using a phase shifting algorithm, emitting the encoded signal with a projector, detecting the emitted signal with a sensor after the emitted signal is reflected by a detected body, associating the detected signal with the emitted signal, identifying an x-axis dimension data, a y-axis dimension data, and a z-axis dimension data of the detected body, and one or more of a range data and a bearing data to the detected body, based upon the associated signal, storing the identified data in a memory, executing first program instructions with a processor supported by the mobile platform to identify a present location of the mobile platform, and executing second program instructions with the processor to navigate the mobile platform based upon the identified location.

The above described features and advantages, as well as others, will become more readily apparent to those of ordinary skill in the art by reference to the following detailed description and accompanying drawings.

DETAILED DESCRIPTION

Figure 1:
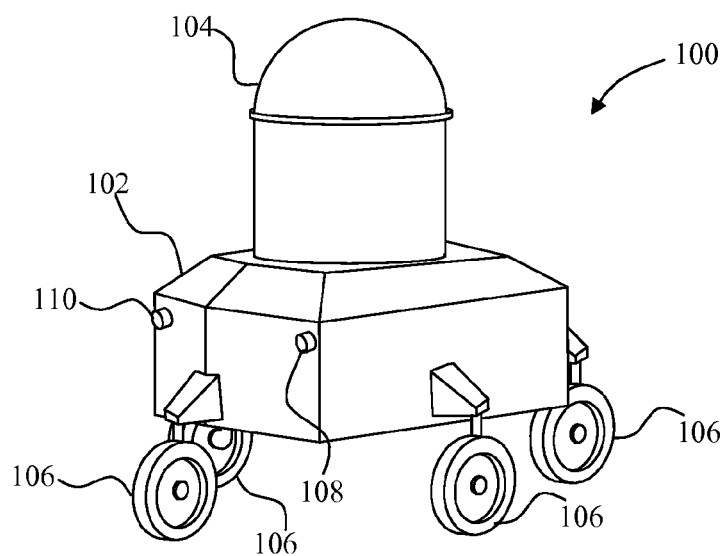
FIG. 1 depicts perspective views of a mobile platform with which the subject invention may be used.

Referring to FIG. 1, there is depicted a mobile platform, generally designated 100. The mobile platform 100 has a housing or support frame 102 and a payload section 104. The mobile platform 100 is conveyed by a number of individually positionable and rotatable wheels 106. The outer side of the support frame 102 further includes a projector port 108, and a camera port 110. In other embodiments, more than one camera port and/or projector port may be provided to allow simultaneous views about the mobile platform 100.

Figure 2:
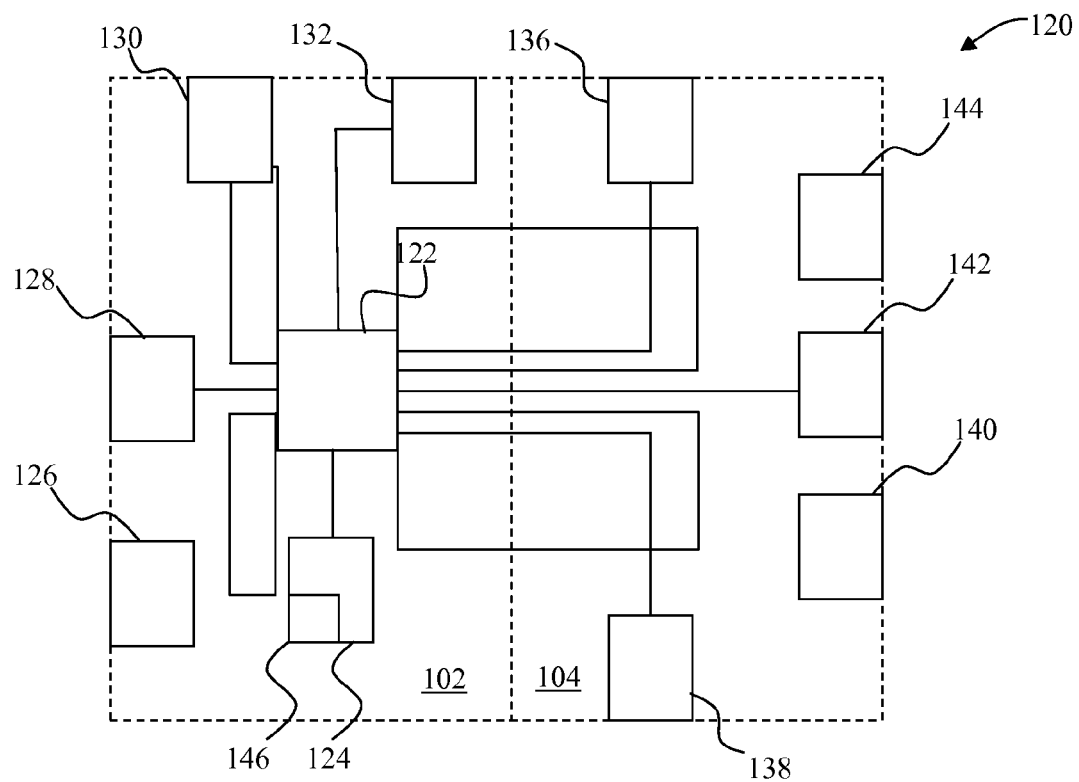
FIG. 2 depicts a block diagram of the components of the mobile platform of FIG. 1.

FIG. 2 depicts a control circuit 120 which is located within the housing 102. The control circuit 120 includes a processor 122 and a memory 124. The processor 132 is operably connected to a power train control system 126, which controls the individually positionable wheels 106, and a power source 128. The processor 132 is also operably connected to a projector 130 and a charge coupling device (CCD) 132 which are physically located adjacent to the projector port 108 and the camera port 110, respectively.

The processor 132 is further operably connected to components within the payload section 104. The components within the payload section 104 will vary depending upon the specific task or tasks which the mobile platform 100 is configured to perform. Likewise, the power train may include devices and configurations other than individually positionable wheels 106. The mobile platform 100 in this embodiment is used to map an area such as an area that is inaccessible to humans. To this end, the payload section 104 includes an atmosphere monitor 136, a radiation detection suite 138, a temperature sensor 140, a magnetic field detector 142, and microphone 144. One or more of the components within the payload section 104 may incorporate micro electromechanical system (MEMS) technology.

Within the memory 124 are stored program instructions 146. The program instructions 146, which are described more fully below, are executable by the processor 122 and/or any other components as appropriate. The program instructions 146 include commands which, when executed by the processor 132 or other components, cause the mobile platform 100 to obtain data for use in characterizing objects in proximity to the mobile platform 100.

Figure 3:
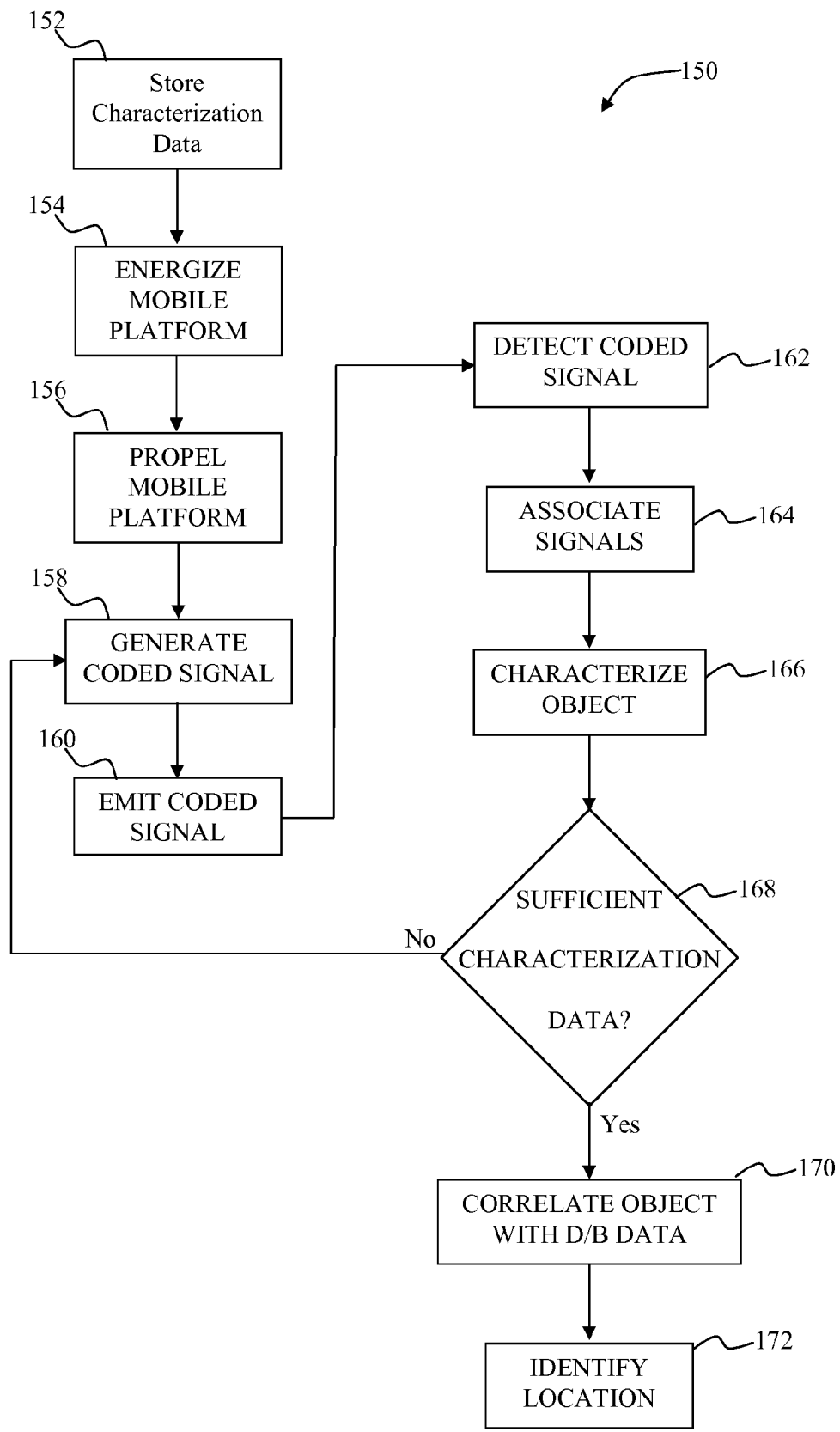
FIG. 3 depicts a procedure for obtaining data for characterizing an object proximate to the mobile platform of FIG. 1.

Referring to FIG. 3, there is depicted a flowchart, generally designated 150, setting forth an exemplary manner of obtaining data for use in characterizing objects in support of a navigation process of the mobile platform 100. Initially, characterization data for at least one object is stored in the memory 124 (block 152). The characterization data may include data which allows the object to be uniquely identified. This data may include physical characteristics including the objects size, shape, reflectivity, etc. The data may further include relative characteristics such as distance and orientation of the object with respect to other known objects, global positioning satellite (GPS) coordinates, and other data.

One the data is stored, the mobile platform 100 is energized (block 154) and the processor 122 controls the power train control system 126 to propel the mobile platform along a route, which may be preprogrammed into the memory 124 to a desired extent (block 156). At a predetermined periodicity, the processor 122 controls the generation of an encoded signal (block 158) and controls the projector 130 to an energized condition to emit the coded signal (block 160).

The processor 122 further controls the CCD 132 to an energized condition and the CCD 132 begins to detect incoming energy. The incoming energy includes encoded signals which have reflected off of objects in an area around the mobile platform 100 (block 162). The processor 132 then compares the reflected signal detected by the CCD 132 with the emitted coded signals to identify the specific signal that was emitted by the projector 130, reflected by an object, and then detected by the CCD 132. This association may be facilitated by uniquely coding each emitted signal in a sequence of signals. Once the emitted and detected signals have been associated, characterization of the object which caused reflection of the coded signal is performed at block 166.

Characterization of the object may include identifying a range from the mobile platform 100 to the reflecting object based upon the timing of the emitted and detected signals. Additionally, a bearing angle to the object may be identified. By way of example, the emitted signal may be emitted in a narrow beam. Alternatively, the direction from which the reflected beam was received may be ascertained.

Additional characterization data may be identified based upon the detected signal. By way of example, U.S. Pat. No. 6,147,760, issued on Nov. 14, 2000, the disclosure of which is herein incorporated by reference, teaches the use of color coding to obtain 3-D data for an object. In one method, the associated data may be used to determine parallax between the emitted beam and the received pattern caused by the spatial offset between the projector 130 and the CCD 132. The parallax is obtained by applying a phase shifting triangulation method which uses sinusoidal fringe patterns. In other approaches, the coding scheme may be a color coding scheme, a spatial coding scheme, or an advanced time series coding scheme.

Characterization data may be obtained through the use of phase shifting methods. With a carefully chosen decoding and phase unwrapping method, high quality measurement results can be achieved. Minimizing the phase steps in phase shifting methods is desirable in non-fixed systems to provide rapid data acquisition. The minimum number of phase steps is offered by the well-known "three bucket algorithm."

The three bucket algorithm, however, is susceptible to first order harmonics as are introduced by non-ideal sinusoidal patterns produce, for example, by non Lambertian light reflection. Therefore, use of the three bucket algorithm in non-laboratory applications typically results in harmonic distortions of the patterns due to arbitrary movements of the camera. A 4-bucket phase decoding algorithm may be used to reduce the impact of the harmonic distortions.

The processor 122 then ascertains if sufficient data regarding the object has been obtained so as to be able to correlate the object (block 168). If sufficient data is available, the processor 122 correlates the detected object with an object stored in the database (block 170). If the data does not allow a correlation of the detected object with a known object (block 168), then the processor controls generation of an additional coded signal (block 158) to obtain additional data.

The sufficiency of the obtained data (block 168) may vary depending upon a number of different variables. In an environment of similarly sized objects, the dimensions of the object may need to be identified with increased accuracy, particularly if dimension and range data are the only data used in characterization. Obtaining accurate dimensional values with a phase shifting algorithm is problematic in that phase shifting algorithms are inherently limited to providing values within the range of one period of the sinusoidal patterns incorporated in the system. This limitation may be mitigated by incorporation of a phase unwrapping algorithm.

Algorithms that unwrap the phase information without further measurements usually assume smooth (continuous) surfaces and phase ambiguities caused by discontinuities and noise cannot be resolved in every case. When incorporated in a mobile system, however, assumptions on the measurement constellation cannot be made. Therefore, the phase unwrapping in one approach is performed incorporating information obtained from additional measurements. Specifically, the coded signal at block 158 is modified to yield a second phase image using a period length different from the period used during the first measurement. The phase may then be unwrapped from the two wrapped phase images using the Chinese remainder theorem (Nonius principle).

The Nonius principle may produce unsatisfactory results since the underlying integer arithmetic requires low-noise images as well as nearly ideal sinusoidal patterns which are usually not achievable with conventional optical devices. An alternative to the Nonius principle is to iteratively refine the phase values starting with a coarse period. Then, the period of the sinusoidal patterns are reduced until the desired measurement accuracy has been reached. The starting period in this alternative approach is selected to be large enough to cover the entire measuring (encoding) range. The starting period thus provides a coarse estimate of the phase values without phase jumps. Subsequently, a second phase image is calculated using a fraction of the starting period length and is then unwrapped using the first phase image.

Once the detected object has been correlated (block 170), the processor 122 uses the characterization data to identify the location of the mobile platform. Location determination can be performed in a variety of alternative processes. A range and a bearing to a single known object are sufficient in many instances to provide sufficient accuracy in identifying the location of the mobile platform 100. Alternatively, ranges to three different objects may be used. In a further embodiment, a range to a single object used in conjunction with onboard sensors may be used. For example, range data for a specific 3-D object may be sufficient to provide a location estimate based upon understanding the most recently obtained data along with a projected track identified using the controlled distance and bearing from the last determined location.

A number of variations may be made to the procedure 150. By way of example, the mobile platform 100 may further be used to initially map an area or to identify changes within an area. In such embodiments, characterization data for objects which are not correlated with known objects are stored in the memory 124. The characterization data may include data identifying the location of the newly characterized object with respect to the location of known objects. Using this data, a 3-D rendering of the area in which the mobile platform 100 has operated may be generated.

Thus, the foregoing processes may be modified in a number of ways within the scope of the invention. Accordingly, while this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

We claim:

1. An autonomously navigated mobile platform comprising:
   a support frame;
   a projector supported by the frame;
   a sensor supported by the frame;
   a memory including a plurality of program instructions stored therein for
      generating an encoded signal using a phase shifting algorithm,
      emitting the encoded signal with the projector,
      detecting the emitted signal with the sensor after the emitted signal is reflected by a detected body,
      associating the detected signal with the emitted signal,
      identifying an x-axis dimension, a y-axis dimension, and a z-axis dimension of the detected body, and one or more of a range and a bearing to the detected body, based upon the associated signal,
      identifying a present location of the mobile platform,
      navigating the mobile platform based upon the identified location; and
   a processor operably connected to the memory, to the sensor, and to the projector for executing the program instructions.

2. The platform of claim 1, wherein the first identifying step comprises:
   phase unwrapping the detected signal.

3. The platform of claim 2, wherein phase unwrapping comprises:
   using a first phase image and a second phase image to phase unwrap the detected signal.

4. The platform of claim 3, wherein the second phase image has a period that is shorter than the period of the first phase image.

5. The platform of claim 2, wherein phase unwrapping comprises:
   using a plurality of phase images, each of the plurality of phase images having a period that is different from the period of the other of the plurality of phase images.

6. The platform of claim 5, wherein the plurality of phase images are obtained in an order starting with a first of the plurality of phase images and progressing to a last of the plurality of phase images, with each of the subsequent of the plurality of images in the order having a period that is shorter than the previously obtained phase image of the plurality of phase images in the order.

7. The platform of claim 6, wherein the last of the plurality of phase images is unwrapped using another of the plurality of phase images.

8. The platform of claim 7, further comprising:
a database of three dimensional data associated with a plurality of known objects stored within the memory, wherein the plurality of program instructions further comprise program instructions for associating the determined x-axis dimension, y-axis dimension, and z-axis dimension of the detected object with one of the plurality of known objects.

9. The platform of claim 8, the plurality of program instructions further comprising:
program instructions for identifying the location of each of a plurality of detected objects with respect to at least one of the plurality of known objects.

10. An autonomously navigated mobile platform comprising:
a support frame;
a projector supported by the frame;
a sensor supported by the frame;
a memory including a plurality of program instructions stored therein for
generating an encoded signal using a phase shifting algorithm,
emitting the encoded signal with the projector,
detecting the emitted signal with the sensor after the emitted signal is reflected by a detected body,
associating the detected signal with the emitted signal,
identifying an x-axis dimension, a y-axis dimension, and a z-axis dimension of the detected body, and one or more of a range and a bearing to the detected body, based upon the associated signal,
identifying a present location of the mobile platform, and
navigating the mobile platform based upon the identified location;
a processor operably connected to the memory, to the sensor, and to the projector for executing the program instructions; and
a database of three dimensional data associated with a plurality of known objects stored within the memory, wherein
the plurality of program instructions further comprise program instructions for associating the identified x-axis dimension, y-axis dimension, and z-axis dimension of the detected object with one of the plurality of known objects, and
identifying a present location further comprises identifying the present location based upon associating the identified x-axis dimension, y-axis dimension, and z-axis dimension of the detected object with one of the plurality of known objects.

11. A method of operating an autonomously navigated mobile platform comprising:
generating an encoded signal using a phase shifting algorithm;
emitting the encoded signal with a projector;
detecting the emitted signal with a sensor after the emitted signal is reflected by a detected body;
associating the detected signal with the emitted signal;
identifying an x-axis dimension data, a y-axis dimension data, and a z-axis dimension data of the detected body, and one or more of a range data and a bearing data to the detected body, based upon the associated signal;
storing the identified data in a memory;
executing first program instructions with a processor supported by the mobile platform to identify a present location of the mobile platform; and
executing second program instructions with the processor to navigate the mobile platform based upon the identified location.

12. The method of claim 11, further comprising:
associating the identified x-axis dimension, y-axis dimension, and z-axis dimension of the detected object with one of a plurality of known objects; and wherein executing first program instructions further comprises:
identifying the present location based upon associating the identified x-axis dimension, y-axis dimension, and z-axis dimension of the detected object with one of the plurality of known objects.

13. The method of claim 11, wherein identifying comprises:
phase unwrapping the detected signal.

14. The method of claim 13, wherein phase unwrapping comprises:
using a first phase image and a second phase image to phase unwrap the detected signal.

15. The method of claim 14, wherein the second phase image has a period that is shorter than the period of the first phase image.

16. The method of claim 13, wherein phase unwrapping comprises:
using a plurality of phase images, each of the plurality of phase images having a period that is different from the period of the other of the plurality of phase images.

17. The method of claim 16, wherein emitting the encoded signal comprises:
emitting a first encoded signal with a first period; and
emitting a second encoded signal with a second period, wherein the second encoded signal is emitted after the first encoded signal is emitted and wherein the second period is selected based upon the first period.

18. The method of claim 17, wherein:
a first phase image is generated based upon the first encoded signal;
a second phase image is generated based upon the second encoded signal; and
the second phase image is unwrapped using the first phase image.

19. The method of claim 11, further comprising:
storing characterization data for a plurality of known objects within the memory;
associating the identified data with characterization data for one of the plurality of known objects.

20. The method of claim 11, the plurality of program instructions further comprising:
storing characterization data for a plurality of known objects within the memory;
identifying the location of the detected object with respect to at least one of the plurality of known objects.

* * * * *